United States Patent [19]
Haase et al.

[11] 3,938,840
[45] Feb. 17, 1976

[54] SHOCK ABSORBER FOR A VEHICLE

[75] Inventors: Ernst-Günter Haase, Egmating; Rudolf König, Ottobrunn, both of Germany

[73] Assignee: Messerschmitt-Bolkow-Blohm Gesellschaft mit beschrankter Haftung, Germany

[22] Filed: Mar. 28, 1974

[21] Appl. No.: 455,895

[30] Foreign Application Priority Data

Apr. 3, 1973 Germany............................. 2316503

[52] U.S. Cl............... 293/71 P; 188/298; 267/140; 293/88
[51] Int. Cl.².......................................... B60R 19/08
[58] Field of Search............ 188/281, 298; 293/71 R, 293/71 P, 85, 88; 267/139, 140

[56] References Cited
UNITED STATES PATENTS

| | | | |
|---|---|---|---|
| 1,552,965 | 9/1925 | Smith | 293/71 P |
| 3,768,850 | 10/1973 | Barton | 293/71 P |
| 3,774,948 | 11/1973 | Gouirand | 293/71 P |
| 3,810,668 | 5/1974 | Kornhauser | 293/71 P |
| 3,837,695 | 9/1974 | Haase et al. | 293/71 P |
| 3,844,544 | 10/1974 | Keilholz | 188/281 |

FOREIGN PATENTS OR APPLICATIONS

| | | | |
|---|---|---|---|
| 1,939,864 | 10/1970 | Germany | 188/281 |
| 443,927 | 10/1912 | France | 188/298 |

*Primary Examiner*—George E. A. Halvosa
*Assistant Examiner*—Edward R. Kazenske
*Attorney, Agent, or Firm*—Toren, McGeady and Stanger

[57] ABSTRACT

In a shock absorber assembly for a vehicle, a closed flexible hollow body is mounted on a rigid support member, such as a part of the vehicle understructure, and a highly compressible fluid medium, for instance air, is filled into the hollow body. Another rigid support member of closed hollow construction is mounted against the opposite side of the hollow body from the support member on the vehicle understructure. The hollow support member can be lined interiorly with a closed bladder-like member and connected by a throttling member to the hollow body to act as an equalizing member when the hollow body is compressed by shock forces. As an alternative, two similar shock absorber assemblies can be spaced apart on a vehicle with each including one of the closed flexible hollow bodies and with the throttling member connected between the hollow bodies in the separate shock absorber assemblies.

1 Claim, 3 Drawing Figures

U.S. Patent  Feb. 17, 1976  3,938,840
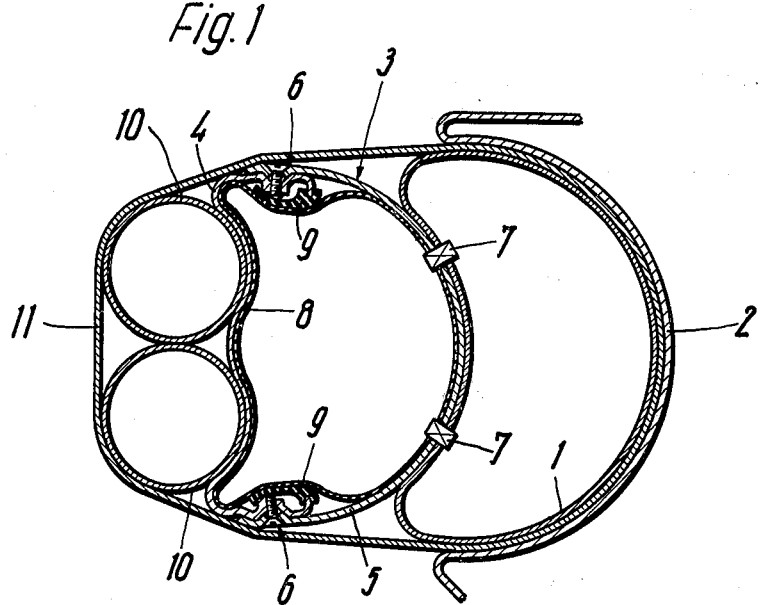
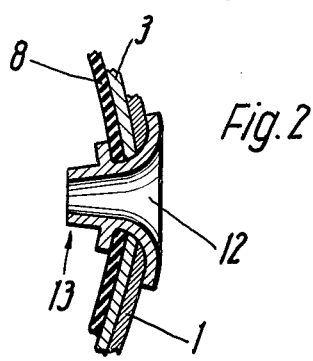
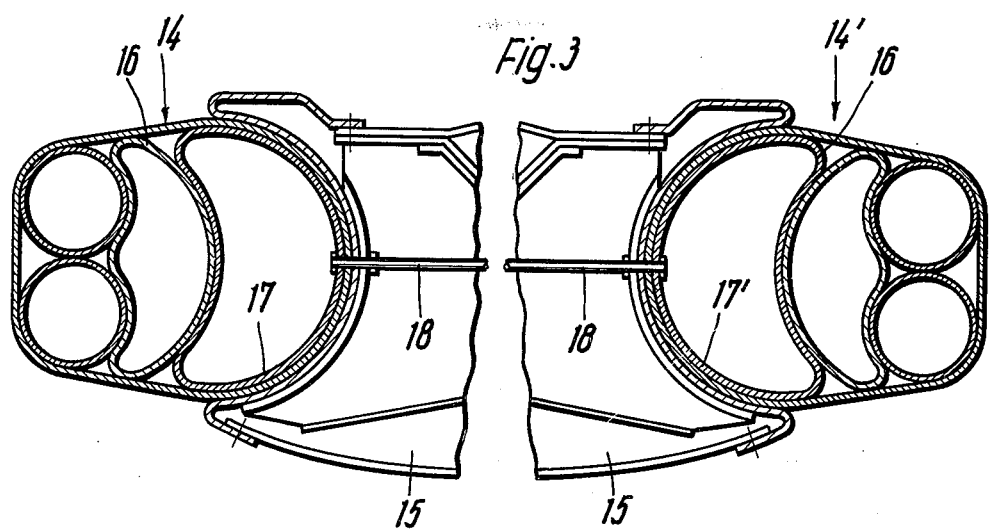

SHOCK ABSORBER FOR A VEHICLE

SUMMARY OF THE INVENTION

The present invention is directed to a shock absorber assembly for a vehicle and, more particularly, it is directed to the arrangement of a flexible hollow body filled with a highly compressible fluid medium, such as air, and with the interior of the hollow body connected to an equalizing chamber formed by a hollow rigid support member which forms a part of the shock absorber assembly or by a similar hollow body in another shock absorber assembly.

In a shock absorber assembly containing a hollow body under internal fluid pressure, it has been suggested to connect the hollow body with an equalizing chamber so that, when the shock asborber assembly strikes against an obstacle, the fluid medium can flow from the hollow body into the equalizing chamber and then return from the equalizing chamber into the hollow body after the external forces causing the displacement of the fluid medium have been removed from the shock absorber assembly. Accordingly, the air volume which has been displaced from the hollow body, due to its compression or contraction, does not have to be replaced when the forces causing the contraction have been removed. Furthermore, this type of shock absorber meets the so-called "Motor Vehicle Safety Standards" of the U.S.A. and according to these standards a device for absorbing impact energy by the accumulation of air pressure or hydraulic pressure must not release the pressure into the atmosphere.

Such shock absorbers are required only in the exceptional instance where the vehicle experiences an impact with an obstacle and the problem is to provide the equalizing vessel within the vehicle in a space saving manner, for example, without cutting down on the space for the passenger compartment, the engine or the trunk compartment and without changing the shape of the vehicle or car body.

Therefore, the primary object of the present invention is to provide an equalizing vessel for the shock absorber assembly of the type described above which can be placed in communication with the hollow body in the assembly without taking up any space in the vehicle.

In accordance with the present invention, a closed hollow rigid support is incorporated into the shock absorber assembly and its interior is arranged in fluid medium communication with the interior of the flexible hollow body so that the support member acts as the equalizing chamber. As an alternative, the vehicle can be provided with two similar shock absorber assemblies and the hollow body of each can be used as the equalizing chamber for the hollow body of the other. In both of these solutions the same characterizing feature is used in that the equalizing chamber is incorporated into the shock absorber assembly in such a way that one part of each shock absorber assembly performs a double function. With such an arrangement the shock absorber assembly can be made substantially smaller and of a lesser overall weight, compared to the shock absorber device described above which is arranged on a vehicle and affords only a storage function. Further, when the hollow rigid support member is used as the equalizing chamber it has the additional advantage that, when the shock absorber assembly strikes against an obstacle, the shearing force of the support member is relieved due to the overpressure within its interior. In the alternative arrangement where the equalizing chamber is provided by the hollow bodies themselves, it is not necessary to provide any special design of the support member. In a vehicle such as a conventional motor car, there is a shock absorber assembly at the front and rear ends of the car and the flexible hollow bodies in such shock absorbers need only be connected over a bypass.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a transverse cross-sectional view of a shock absorber assembly embodying the present invention;

FIG. 2 is an enlarged partial detail view of a connection between two parts of the shock absorber assembly shown in FIG. 1; and FIG. 3 is a cross-sectional view on a reduced scale illustrating two shock absorber assemblies of the type shown in FIG. 1 mounted on the opposite ends of the understructure of a car body.

DETAILED DESCRIPTION OF THE INVENTION

In the drawing a shock absorber assembly is shown and is used to protect a motor vehicle, not shown, against shocks experienced in a collision. The shock absorber assembly shown in FIG. 1 includes a closed flexible hollow body 1 which is positioned, on one side, against a rigid support member 2 and can be a part of the understructure or chassis of a car body. The support member 2 is of the type which is exposed to a bending action and is formed to resist such bending action. The flexible wall of the hollow body 1 is formed of an elastic material, for example, a hose fabric with an interior spring action which prevents a hollow body without internal pressurization from collapsing. A highly compressible fluid medium is filled into the hollow body and, preferably, air is used as the fluid medium. On the opposite side of the hollow body from the support member 2 is another rigid support member or girder 3. The surface of the support member 3 in contact with the hollow body 1 has the same general configuration as the surface of the support member 2 which contacts the hollow body. The support member 3 is a hollow closed member and consists of two shell parts 4, 5 for facilitating the production and maintenance of the support member. The shell parts 4 and 5 are detachably connected together by bolt means 6 threaded into one of the parts.

As shown in FIG. 1, the hollow support member 3 forms an equalizing chamber for the hollow body 1 and the interior of both of the parts of the shock absorber assembly are connected through conventional valves 7 which open automatically when a certain overpressure or limiting pressure is reached within the interior of the hollow body 1. Further, the valves 7 provide a throttling effect on the return flow of the fluid medium from the equalizing chamber in the support member 3 into the hollow body 1. Air, used as the fluid medium in the hollow body 1, flows through the valves 7 into the support member 3 and is received within a bladder-like lining 8 formed of rubber or a similar material which is secured to the interior of the support member. The interior of the bladder-like lining 8 is maintained at the same internal pressure as the space within the hollow body 1. Since the bladder-like lining 8 forms a gas-tight coating on the interior of the support member 3, it prevents air introduced into the support member from escaping into the atmosphere. Any possible damage to the lining 8 by sharp edges within the interior of the support member, particularly in the range of the joint between the shell parts 4, 5, is prevented by means of a cover section 9 attached to one of the shell parts and extending over the inner end of the bolts 6. Spacer elements can be arranged between the shell parts 4, 5 to support the shell parts and prevent the support member 3 from collapsing during the transmission of shearing force. Further, the shell parts 4, 5 can be provided with corrugations for this purpose.

Arranged on the opposite side of the support member 3 from the hollow body 1 are two flexible hollow bodies 10 each seated in contact against the surface of the support member. These two hollow bodies form the front surface, that is the surface of the shock absorber assembly which is contacted initially when a collision or impact with an obstacle occurs. These flexible hollow bodies 10 are also filled with air as a compressible fluid medium and, as a rule, the air is provided within the hollow body under an overpressure, however, such pressure conditions are not necessary in the hollow body 1 or within the chamber defined by the lining 8 in the support member 3. The shock absorber assembly, that is the hollow body 1, the support member 3, and the hollow bodies 10, are enclosed and held together by a flexible jacket 11 which can be adhered to the surface of the support member 2. It can be noted in FIG. 1 that the flexible jacket 11 is positioned between and in surface contact with the convex surface of the hollow body 1 and the concave surface of the support member 2.

When the shock absorber assembly shown in FIG. 1 experiences an impact as the result of contact with an obstacle, the impact is transmitted over the hollow bodies 10, forming the forward portion or rearward portion of the assembly depending on the position of the assembly on a vehicle, to the rigid support member 3. Locally limited impact forces directed against the hollow bodies 10 are transformed by the support member 3 into a line load or force against the surface of the hollow body 1. The two hollow bodies 10 can absorb punctiform shocks and protect the support member 3 against local overload. It can be appreciated that FIG. 1 illustrates a transverse view of a shock absorber which extends longitudinally across the surface of a vehicle, such as the front and rear bumper surfaces of a vehicle. The hollow body 1 which receives the shock as a line load, functions both for suspension and absorption. When the effect of the shock is transmitted to the hollow body 1 it will initially contract under the action of the shock forces and its internal pressure will rise. When the limiting pressure of the valves 7 is reached, such pressure depends on the weight of the car and the dimensions of the shock absorber, the valves will open and permit the flow of the compressible fluid medium from the hollow body into the chamber within the support member 3. As a result the shock forces caused by the impact are absorbed by the shock absorber assembly and because the hollow body 1 can contract completely because of the mating forms of the support members 2, 3, there is practically no springback experienced when full contraction takes place. The total volume of the air within the hollow body can, for all practical purposes, flow completely into the chamber in the support member 3 defined by the bladder-like lining 8. After the shock absorber assembly is relieved, that is the force causing the impact no longer acts against the body member 10, a throttled return flow of the volume of air displaced from the hollow body 1, flows from the chamber in the support member 3 into the hollow body and slowly and automatically the hollow body regains its original shape. Accordingly, there is nothing that need be done to return the shock absorber assembly to its original arrangement, the return of its shape or configuration takes place automatically.

It should be noted that the hollow body 1 can also communicate with the support member 3 over one or a number of nozzle-shaped bypasses 12 instead of the valves 7, note the shape of the bypasses 12 in FIG. 2. With this arrangement there is the advantage that the hollow body 1 and the chamber within the lining 8 of the support member 3 are constantly under the same internal pressure. The mouth or end 13 of the bypass 12 within the chamber in the support member protrudes inwardly from the lining 8. Further, the entrance to the bypass 12 on the hollow body side has a greater cross-section than on the support member side and the wall surfaces of the bypass converge from the hollow body side to the support member side. Accordingly, the mouth 13 acts on any return flow from the chamber in the support member into the hollow body like a diaphragm. The return flow is throttled to a greater degree than the oppositely directed flow from the hollow body 1 into the support member 3.

In FIG. 3 another embodiment of the invention is illustrated and consists of two identically constructed shock absorber assemblies 14, 14', with the absorber assembly 14 located on the front end of a vehicle understructure and the other absorber assembly 14' located at the rear end of the understructure. These shock absorber assemblies 14, 14' are constructed substantially in the same manner as the assembly illustrated in FIG. 1 with the exception of the construction of the suupport member 16 located between the flexible hollow bodies. As differentiated from the support member 3 in FIG. 1, the bending members 16 are not designed as equalizing chambers for the corresponding flexible hollow body 17, 17'. The function of the equalizing chamber is assumed by the flexible hollow bodies 17, 17' themselves, that is when one of the shock absorber assemblies experiences shock forces the air driven from the hollow body as it is compressed or contracted flows through a bypass 18 into the hollow body in the other shock absorber assembly. As can be seen in FIG. 3 the bypass 18 extends through the understructure 15 between the two hollow bodies 17, 17'. If the shock absorber assembly 14 is considered as being located at the front of the vehicle and the front of the vehicle experiences an impact in a collision, the air flows from the hollow body 17 in the assembly 14 into the hollow body 17' of the rear end shock absorber assembly 14'. If the rear end of the vehicle experiences an impact in a collision the flow between the hollow bodies 17, 17' takes place in the reverse direction.

It should be noted that the hollow support member in a shock absorber assembly as shown in FIG. 1, can be subdivided, that is, it can be formed of an extruded section.

While specific embodiments of the invention have been shown and described in detail to illustrate the application of the inventive principles, it will be understood that the invention may be embodied otherwise without departing from such principles.

What is claimed is:

1. In a shock absorber assembly for a vehicle, such as a bumper member for a vehicle, including a flexible closed hollow body arranged to be filled with a flowable, highly compressible fluid medium, such as air, said hollow body arranged to absorb impact forces, and a first rigid support member extending along and disposed in juxtaposition with said hollow body, a second support member arranged on the opposite side of said hollow body from said first support member, wherein the improvement comprises that said second support member is a rigid closed hollow vessel and is disposed in juxtaposition with said hollow body substantially complementary to said first support member, means establishing communication between said second support member and said hollow body so that said second support member acts as an equalizing vessel for receiving the fluid medium from said flexible hollow body when such hollow body is compressed under the application of shock forces directed against the shock absorber assembly and being transmitted to said hollow body through said second support member, said first support member arranged to be mounted on the understructure of a vehicle body, at least one second flexible hollow body mounted in contact with said second support member on the opposite side thereof from said hollow body located between said first and second support members, a flexible jacket laterally enclosing and disposed in contact with said hollow body between said first and second support members and said second hollow body and also with said second support member and located between the juxtaposed surfaces of said hollow body and said first support and disposed in surface contact with said hollow body and said first support member.

* * * * *